United States Patent
Brodeur et al.

(10) Patent No.: US 10,700,507 B2
(45) Date of Patent: Jun. 30, 2020

(54) DUPLEX ELECTRICAL CABLE FITTING

(71) Applicant: Thomas & Betts International LLC, Wilmington, DE (US)

(72) Inventors: Marc Brodeur, St-Jean sur Richelieu (CA); Marc-Antoine Veillette, Ange-Gardien (CA)

(73) Assignee: Thomas & Betts International LLC, Wilmington, DE (US)

( * ) Notice: Subject to any disclaimer, the term of this patent is extended or adjusted under 35 U.S.C. 154(b) by 600 days.

(21) Appl. No.: 15/591,202

(22) Filed: May 10, 2017

(65) Prior Publication Data

US 2017/0346271 A1    Nov. 30, 2017

Related U.S. Application Data

(60) Provisional application No. 62/342,293, filed on May 27, 2016.

(51) Int. Cl.
*H02G 3/18* (2006.01)
*H02G 15/00* (2006.01)
(Continued)

(52) U.S. Cl.
CPC .............. *H02G 15/08* (2013.01); *H02G 1/06* (2013.01); *H02G 3/0616* (2013.01); *H02G 3/0683* (2013.01)

(58) Field of Classification Search
CPC ........ H02G 15/08; H02G 1/06; H02G 3/0616; H02G 3/0683; H02G 15/00; H02G 15/06;
(Continued)

(56) References Cited

U.S. PATENT DOCUMENTS 1,887,192 A   11/1932   Betts, Jr.
1,888,546 A   11/1932   Anderson
(Continued)

FOREIGN PATENT DOCUMENTS

CN   202474236 U   10/2012
CN   103227378 A    7/2013
(Continued)

OTHER PUBLICATIONS

Arlington Industries, Inc., "90° Connectors with Sliding Cover", 2016, www.aifittings.com/catalog/flex-ac-mc/90-degree-connectors-with-sliding-covers/.
(Continued)

*Primary Examiner* — Angel R Estrada
(74) *Attorney, Agent, or Firm* — Taft Stettinius & Hollister LLP; J. Bruce Schelkopf

(57) ABSTRACT

A duplex electrical cable fitting includes a connector body having a mounting member and a base member, a cover having a cover hook, and a locknut configured to engage with the mounting member. The mounting member has a mounting member sidewall extending between first and second open ends with the first and second open ends defining a cable passage therebetween. The base member has a cover engaging member, which defines a cover engaging hole. The base member is connected to the mounting member at the second open end and extends downwardly therefrom. The cover hook is movably connected to the base member via the cover engaging hole so as to allow the cover to be movable relative thereto between open and closed positions.

20 Claims, 6 Drawing Sheets

(51) Int. Cl.
*H02G 15/08* (2006.01)
*H02G 1/06* (2006.01)
*H02G 3/06* (2006.01)

(58) Field of Classification Search
CPC .. H02G 15/064; H02G 15/076; H02G 15/085; H02G 15/103; H02G 3/00; H02G 3/22; H02G 3/24; H02G 3/30; H02G 3/32; H02G 3/36
USPC ........ 174/68.1, 68.3, 152 R, 84 R, 665, 656, 174/21 R, 88 R, 657, 64, 72 A, 152 G, 174/153 G, 480, 481, 151, 135, 167, 650, 174/659, 663, 653; 248/49, 62, 63, 74.4, 248/56, 68.1; 16/2.1, 2.2; 439/557, 567, 439/553, 552, 357, 358
See application file for complete search history.

(56) References Cited

U.S. PATENT DOCUMENTS

| | | | |
|---|---|---|---|
| 7,022,914 B1 | 4/2006 | Kiely | |
| D530,678 S * | 10/2006 | Kiely | D13/149 |
| 7,164,086 B1 | 1/2007 | Kiely | |
| 7,304,251 B1 * | 12/2007 | Gretz | H02G 3/0691 174/653 |
| 7,582,831 B2 * | 9/2009 | Kiely | H02G 3/0691 174/84 R |
| 8,119,933 B2 * | 2/2012 | Auray | H02G 15/04 174/650 |
| 8,242,369 B2 * | 8/2012 | Kiely | H02G 3/0691 174/84 R |

FOREIGN PATENT DOCUMENTS

| | | |
|---|---|---|
| CN | 102037618 B | 1/2014 |
| JP | 5854864 B2 | 2/2016 |

OTHER PUBLICATIONS

Arlington Industries, Inc., "90° Connectors", 2016, www.aifittings.com/catalog/flex-ac-mc/90-degree-connectors/.

Arlington Industries, Inc., "90° Duplex Snap-Tite® Connector", 2016, www.aifittings.com/catalog/flex-ac-mc/90-degree-duplex-snap-tite-connector/.

Garvin Industries, "3/8" 90 Degree Flexible Metal Conduit Saddle Clamp Connector", 2014, www.garvinindustries.com/conduit-fittings/supports/flexible-metal-conduit-connectors/90-degree-snap-in-connectors/snlk-3890#Description.

Gampak, "3/8in 90 Degree Flex Angle Connector (49801)", 2016, www.acehardware.com.

* cited by examiner

DUPLEX ELECTRICAL CABLE FITTING

CROSS REFERENCE TO RELATED APPLICATIONS

This application claims priority to U.S. Provisional Patent Application No. 62/342,293, filed on May 27, 2016, the contents of which are incorporated herein by reference in its entirety.

FIELD OF THE INVENTION

The present invention relates to electrical cable fittings, and more particularly, to duplex electrical cable fittings configured to provide a 90 degree dual fitting.

BACKGROUND OF THE INVENTION

An electrical cable fitting is used to securely mount electrical cables through a knockout opening of an enclosure (e.g., electrical box, outlet box, junction box). Currently, there are various electrical cable fittings available in the market such as a straight duplex fitting (FIG. 1) and a single fitting with a 90 degree construction (FIG. 2). Generally, each electrical cable fitting with a 90 degree construction available in the market includes a base member and a cover secured to the base member with a screw or other connector. This design and configuration provide one entry for multiple electrical cables. However, due to the direction of the electrical cables and the limited space available around the enclosure, it is often difficult and inconvenient to work with the currently available electrical cable fittings. Users need a 90 degree fitting with more than one entry for the multiple electrical cables to install them more effectively and efficiently.

Accordingly, although various electrical cable fittings are available currently in the market, further improvements are possible for fittings with a 90 degree construction that provide easy installation of electrical cables therewithin.

SUMMARY OF THE INVENTION

According to an embodiment of the present invention, a duplex electrical cable fitting includes a connector body including a mounting member having a mounting member sidewall extending between first and second open ends, the first and second open ends defining a cable passage therebetween and a base member having a cover engaging member, the cover engaging member defining a cover engaging hole, wherein the base member is connected to the mounting member at the second open end and extends downwardly therefrom, a cover having a cover hook, the cover hook movably connected to the base member via the cover engaging hole so as to allow the cover to be movable relative thereto between open and closed positions, and a locknut configured to engage with the mounting member.

According to a method aspect, a method of using a duplex electrical cable fitting includes affixing the duplex electrical cable fitting to an enclosure by securing a mounting member of a connector body through a desired knockout opening of the enclosure, opening a cover of the duplex electrical cable fitting such that the cover is substantially parallel with the mounting member of the connector body, installing electrical cables via openings in opposite ends of the mounting member of the connector body, closing the cover, and affixing the cover to a base member of the connector body with a captive screw.

These and other aspects of the present invention will be better understood in view of the drawings and following detailed description.

DETAILED DESCRIPTION OF PREFERRED EMBODIMENTS

Figure 1:
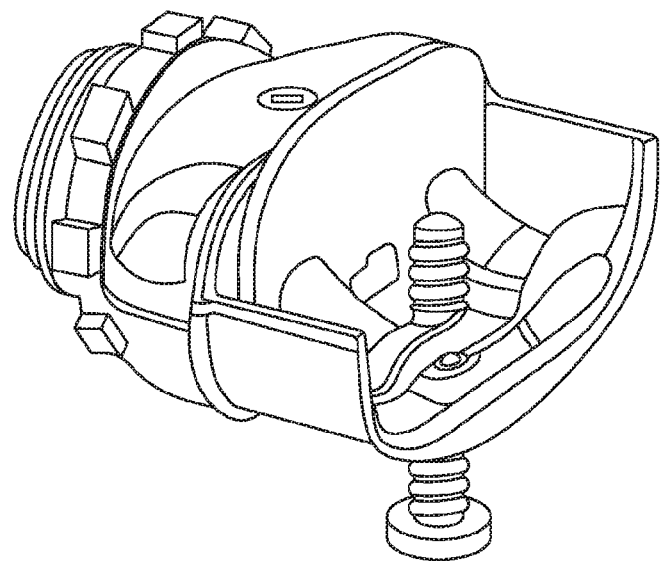
FIG. 1 is a perspective view of a prior art for mounting electrical cables through an enclosure.
Figure 2:
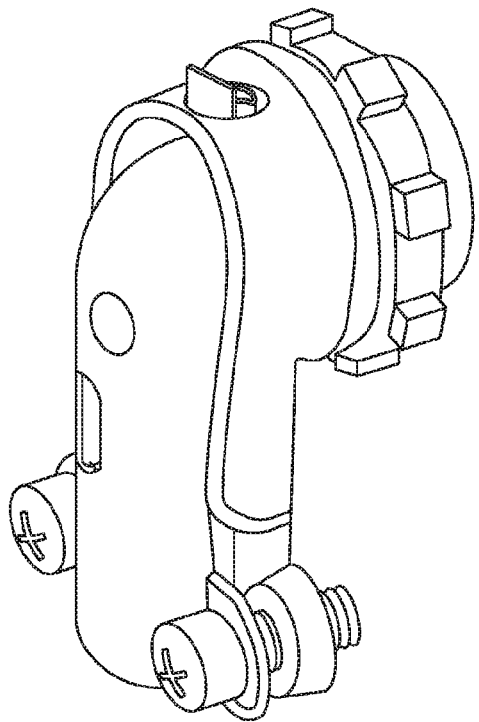
FIG. 2 is a perspective view of a prior art for mounting electrical cables with a 90 degree construction.
Figure 3:
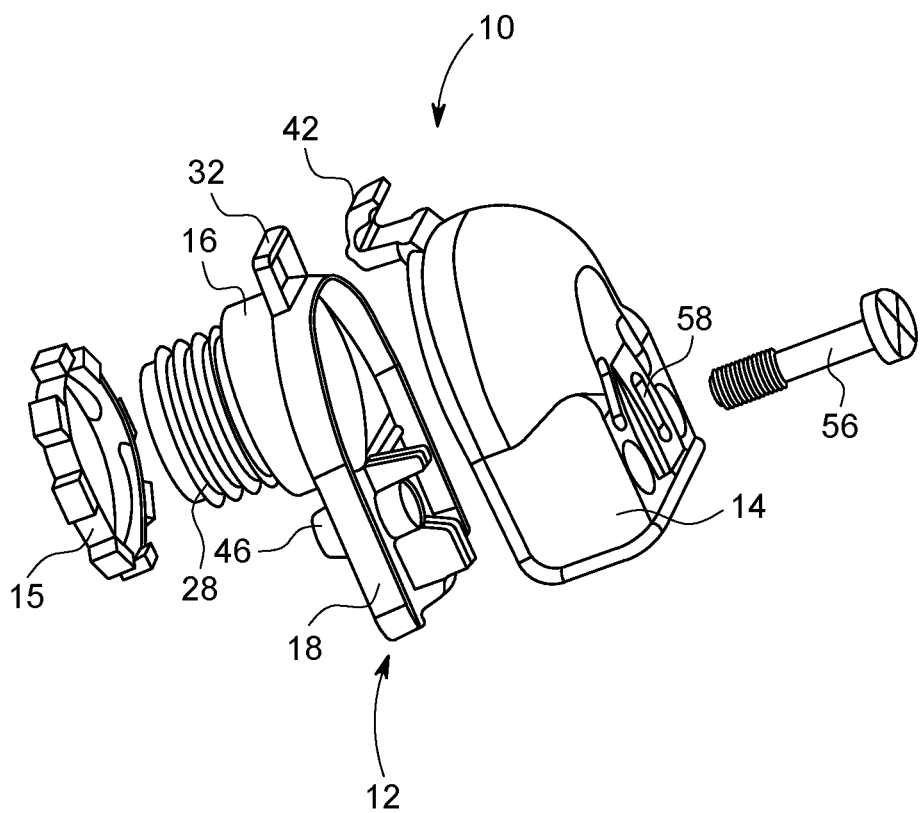
FIG. 3 is a partially-exploded perspective view of the duplex electrical cable fitting, according to an embodiment of the present invention.
Figure 4:
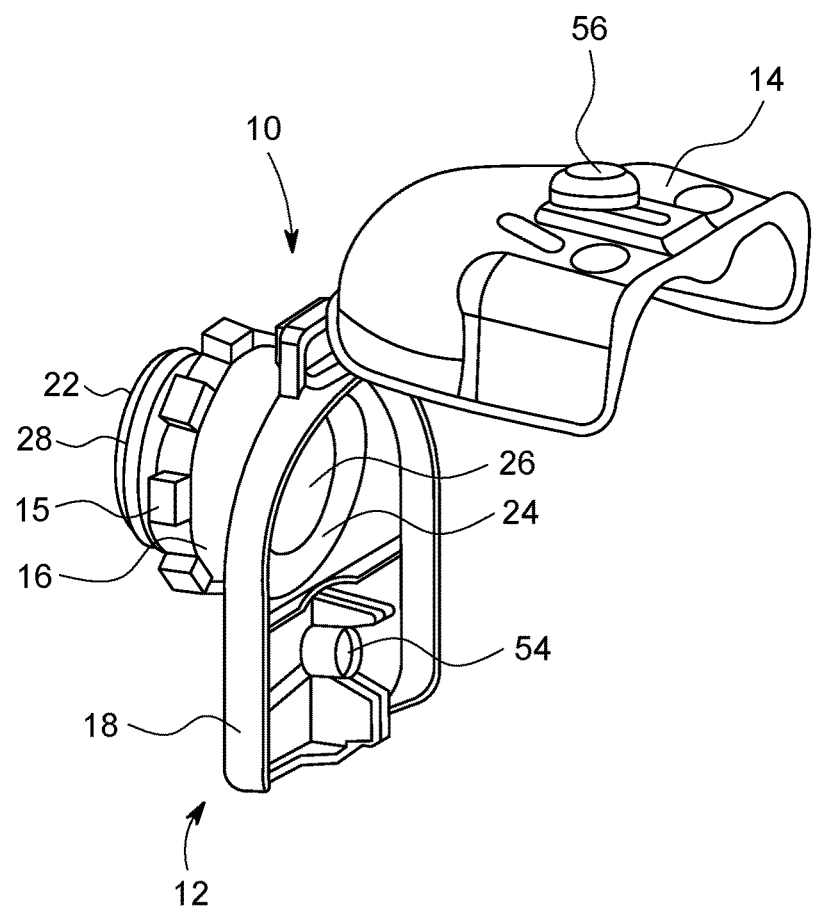
FIG. 4 is a perspective view of the duplex electrical cable fitting in FIG. 3 in an open position.
Figure 5:
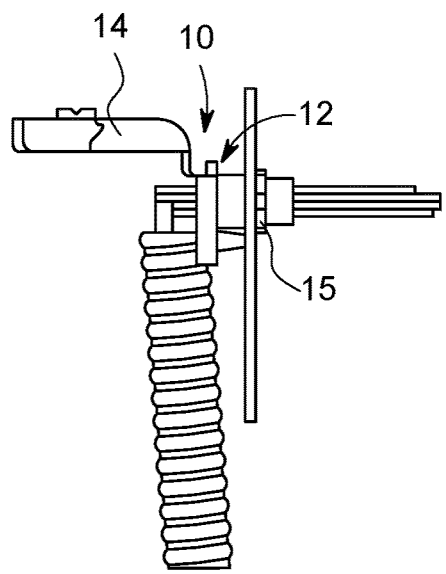
FIG. 5 is a side view of the duplex electrical cable fitting in FIG. 3 secured to an enclosure with electrical cables installed therewithin.

According to an embodiment of the present invention, referring to FIGS. 3-5, a duplex electrical cable fitting 10 includes a connector body 12, a cover 14 which is movably connected to the connector body 12, and a locknut 15. The duplex electrical cable fitting 10 provides a 90 degree fitting with a two entries configuration such that multiple electrical cables may be installed therewithin, as illustrated in FIG. 5.

Figure 6:
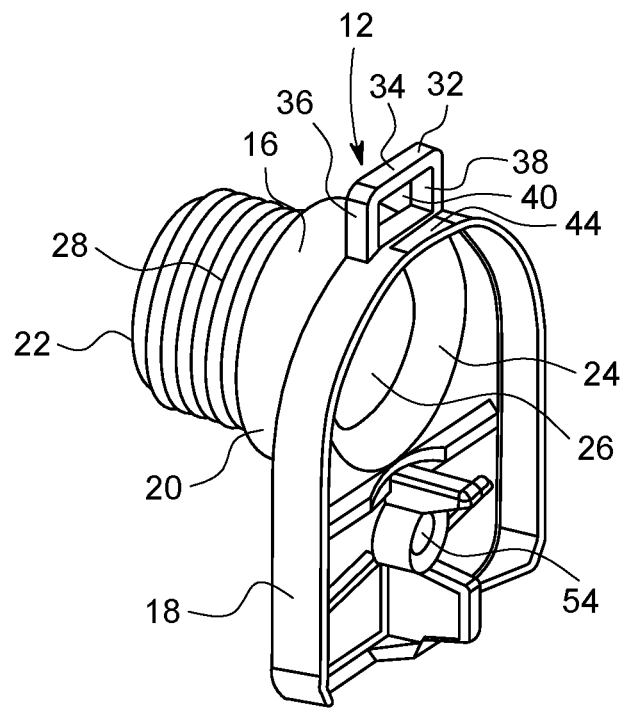
FIG. 6 is a perspective view of the connector body of the duplex electrical cable fitting in FIG. 3.

Referring to FIG. 6, the connector body 12 includes a mounting member 16 and a base member 18 which is connected to the mounting member 16. The mounting member 16 is substantially cylindrical and has a mounting member sidewall 20 extending between first and second open ends 22, 24, respectively, thereby defining a cable passage 26 therebetween. The first and second open ends 22, 24 provide two entries for electrical cables to be installed within the cable passage 26 of the duplex electrical cable fitting 10.

Referring more particularly to FIG. 4, the mounting member 16 includes external threads 28 formed about the first open end 22, for locking threaded engagement with the locknut 15, such that the duplex electrical cable fitting 10 can be secured to an enclosure (e.g., electrical box, outlet box, junction box). For example, once the locknut 15 is removed from the external threads 28, the mounting member 16 of the connector body 12 could be inserted into a desired knockout opening of the enclosure. Then, the locknut 15 can be fastened to the external threads 28 from the inside of the enclosure to secure the duplex electrical cable fitting 10 to the enclosure.

Referring again to FIGS. 4 and 6, the base member 18 extends downwardly from the second open end 24 of the mounting member 16 such that the mounting and base members 16, 18 are substantially perpendicular to each other. The base member 18 supports the electrical cables once they are installed through the cable passage 26. The base member 18 has a U-shaped cross section and includes a cover engaging member 32 that is positioned on top of the base member 18. The cover engaging member 32 is substantially rectangular in form and includes a top bar 34 and first and second side bars 36, 38 that extend upwardly from the top of the base member 18, each of which transitions to the top bar 34. The top, first and second side bars 34, 36, 38 define a cover engaging hole 40 through which a cover hook 42, as will be described in greater detail below, is inserted to allow the cover 14 to transit between the open and closed positions. A flat 44 is defined and positioned closely adjacent to the cover engaging member 32 to provide stability for the cover 14 when it is in the open position. In the depicted embodiment, the cover engaging member 32 is formed integrally with the base member 18; alternately, the cover engaging member 32 could be welded thereto or attached via some other means.

Figure 7:
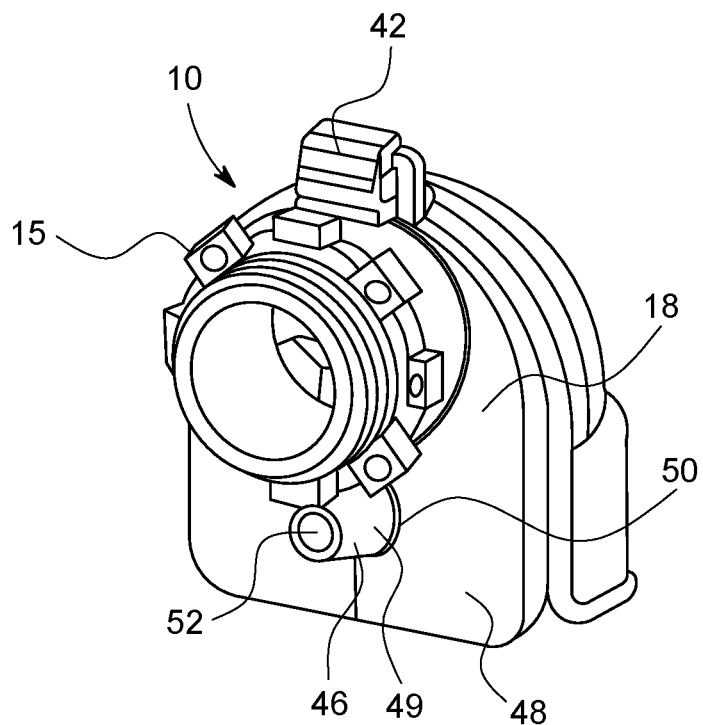
FIG. 7 is a perspective view of the duplex electrical cable fitting in FIG. 3 in a closed position.

Referring to FIGS. 4, 6 and 7, the base member 18 further includes a cover connector receiver 46 in the bottom portion of the base member 18, protruding from a front surface 48 thereof. The cover connector receiver 46 has a cover connector receiver sidewall 49 extending between open and closed ends 50, 52. The cover connector receiver 46 is internally screw threaded (not shown). A cover connector opening 54, which is defined in the base member 18, is configured to align with the open end 50 of the cover connector receiver 46, such that a captive screw 56 or other connector could be inserted through the aligned openings and fastened for affixing the cover 14 to the base member 18. In the depicted embodiment, the cover connector receiver 46 is a cone shaped structure; alternately, the cover connector receiver 46 could be in any shape, as deemed suitable for the application. The cover connector receiver 46 is dimensioned to closely accommodate the captive screw 56 or other connector and provides stability when the duplex electrical cable fitting 10 is installed.

Figure 8:
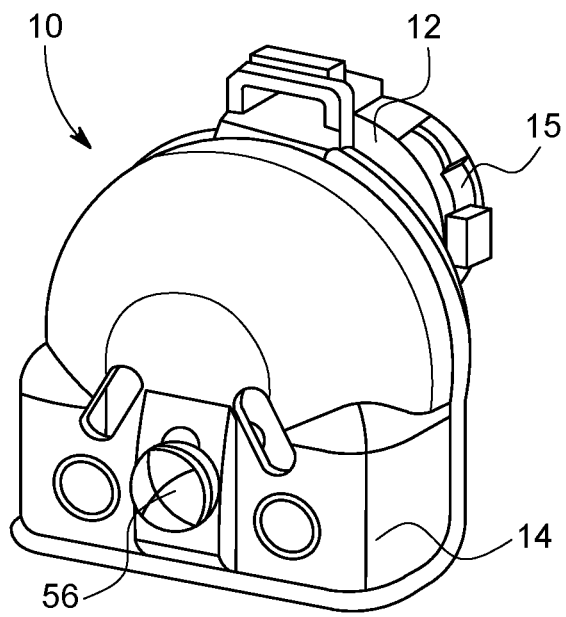
FIG. 8 is another perspective view of the duplex electrical cable fitting in FIG. 3 in a closed position.
Figure 9:
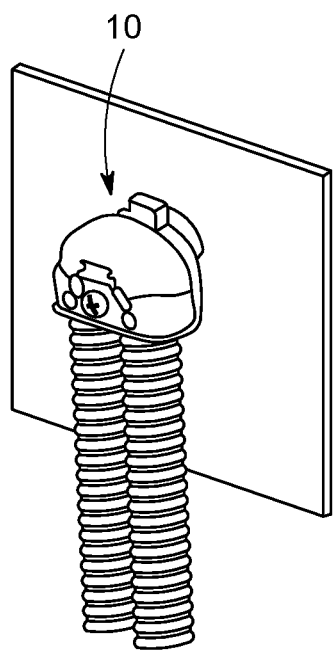
FIG. 9 is a perspective view of the duplex electrical cable fitting in FIG. 3, in a closed position, secured to an enclosure with electrical cables installed therewithin.

The cover 14 is movably connected to the top of the con or body 12 and repositionable relative thereto between the open (FIG. 4) and closed (FIG. 8) positions. In the closed position, the cover 14 completely encloses the base member 18 and surrounds a part of the electrical cables that are placed along the base member 18, as shown in FIG. 9.

Figure 10:
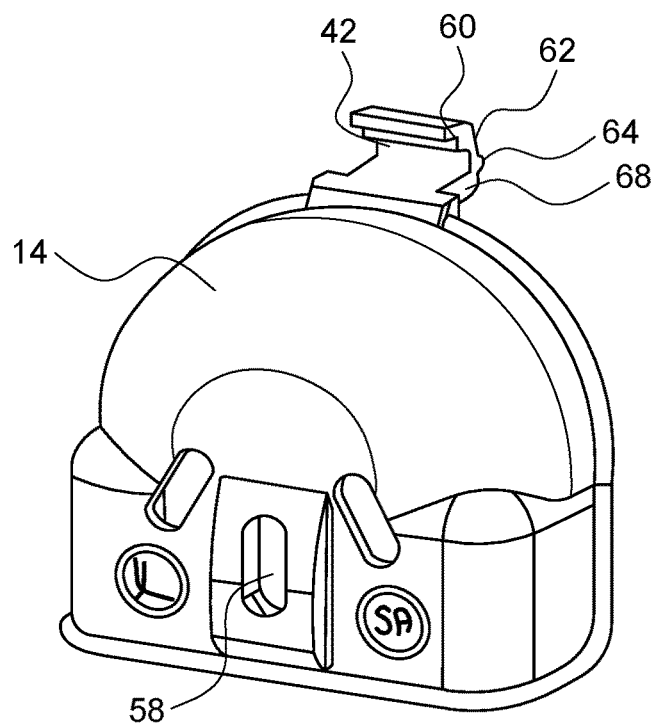
FIG. 10 is a perspective view of the cover of the duplex electrical fitting in FIG. 3.
Figure 11:
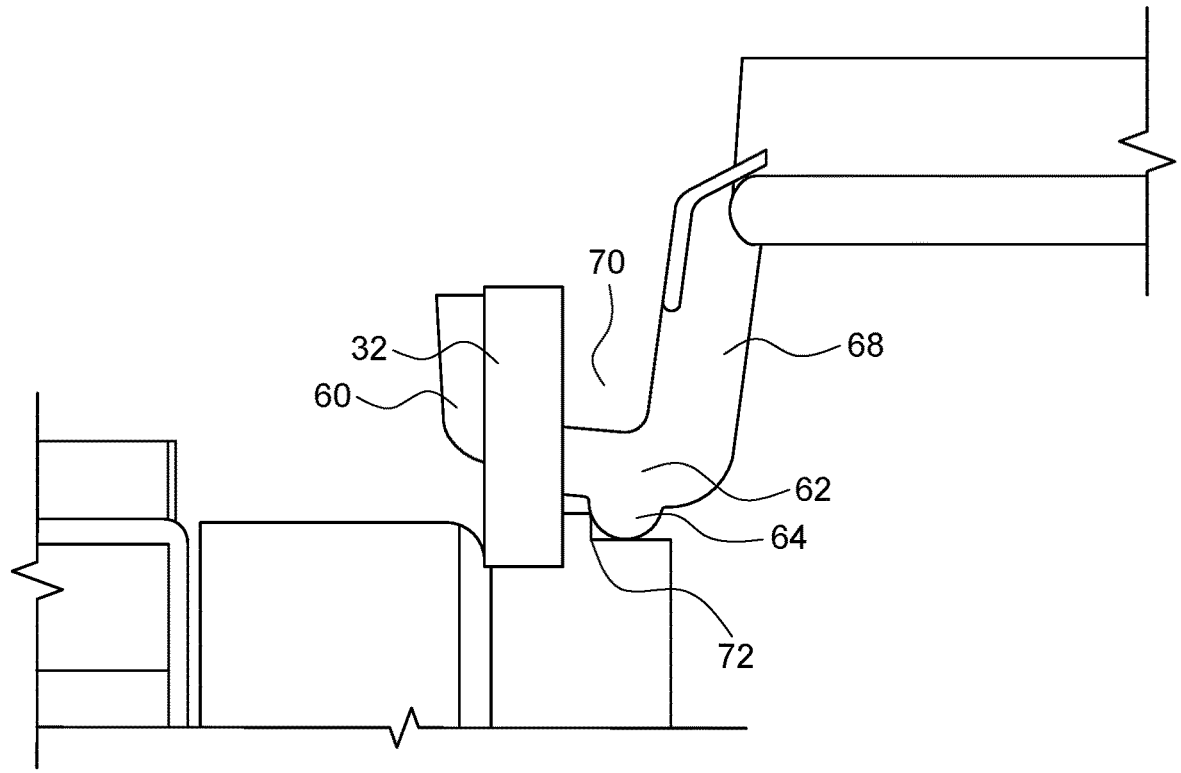
FIG. 11 is a side view of an engagement of the cover hook and the cover engagement member in FIG. 3 in an open position.

Referring to FIGS. 10 and 11, the cover 14 is U shaped and includes the cover hook 42 which is configured to engage with the cover engaging member 32 to provide a movable connection of the cover 14. The cover 14 could be completely detached from the connector body 12 by fully disengaging the cover hook 42 from the cover engaging member 32. The cover 14 defines a cover connecting hole 58 through which the captive screw 56 or other connector could be inserted to affix the cover 14 to the base member 18 of the connector body 12.

Referring again to FIGS. 3, 10 and 11, the cover hook 42 is positioned at the top end of the cover 14 and includes a "stair shaped" front hook portion 60, a lower hook portion 62 having a cover stabilizer 64 radially protruding from an outer surface thereof, and a rear hook portion 68 that transitions to the cover 14. The cover hook 42 and the top bar 34 are designed and dimensioned such that, in the closed position, the top bar 34 is placed and frictionally fitted within the width of a cover hook opening 70, as illustrated in the FIG. 8. In addition, in the closed position, the front hook portion 60 is substantially parallel to the mounting member 16 and the lower hook portion 62 is substantially perpendicular to the mounting member 16.

In the open position, the front hook portion 60 is fully disengaged from the cover engaging member 32, and the lower hook portion 62 is substantially parallel with the mounting member 16 of the connector body 12 with the cover stabilizer 64 sliding onto the flat 44. In addition, in the open position, the cover 14 and lower hook portion 62 are substantially parallel with the mounting member 16, and the front hook portion 60 is substantially parallel with the base member 18. A flat wall 72 prevents the cover stabilizer 64 from sliding back through the cover engaging hole 40, thereby maintaining the open position.

In the depicted embodiment, the cover engaging member 32 has a substantially rectangular cross-section. However, other cross-sections, such as circular, could be formed. The connector body 12 and cover 14 are made of one or more materials having suitable properties for a desired application, including strength, weight, rigidity, etc. Metal and plastic are generally preferred for the connector body 12 and cover 14, respectively. While the cover hook 42 is stair shaped in the depicted embodiment, it will be appreciated that other designs and configurations could be used for the cover hook 42, as deemed suitable for movably connecting the cover 14 to the connector body 12.

In use of the duplex electrical cable fitting 10, first, a user affixes the duplex electrical cable fitting 10 to an enclosure by securing the mounting member 16 of the connector body 12 through a knockout opening of the enclosure. Then, the user fully opens the cover 14 of the duplex electrical cable fitting 10 such that the cover 14 is substantially parallel with the mounting member 16 of the connector body 12. The user then may install electrical cables via both openings in opposite ends of the mounting member 16 of the connector body 12. Once the user has installed the electrical cables within the duplex electrical cable fitting 10, the cover 14 can be closed and affixed to the base member 18 of the connector body 12 with the captive screw 56 or other connector.

From the foregoing, it will be appreciated that a duplex electrical cable fitting according to the present invention provides a 90 degree dual fitting with two entries for multiple electrical cables, thus making easy and convenient for a user to work with the fitting.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and of the claims appended hereto.

What is claimed is:

1. A duplex electrical cable fitting comprising:
   a connector body including:
      a mounting member having a mounting member sidewall extending between first and second open ends, the first and second open ends defining a cable passage therebetween; and
      a base member having a cover engaging member, the cover engaging member defining a cover engaging hole, wherein the base member is connected to the mounting member at the second open end and extends downwardly therefrom;
   a cover having a cover hook, the cover hook movably connected to the base member via the cover engaging hole so as to allow the cover to be movable relative thereto between open and closed positions, the cover engaging member including a top bar, the top bar being sized and position to frictionally fit within a cover hook opening of the cover to resist displacement of the cover hook away from the closed position, the cover hook further including a cover stabilizer positioned and sized to engage a flat on an outer surface of the base member to maintain the cover hook in the open position; and a locknut configured to engage with the mounting member.

2. The duplex electrical cable fitting of claim 1, wherein external threads are formed about the first open end of the mounting member, and wherein the base member further includes a back wall sized and positioned to prevent slidable displacement of the cover while the cover stabilizer is engaged with the flat.

3. The duplex electrical cable fitting of claim 2, wherein the locknut is adapted to engage with the external threads such that the duplex electrical cable fitting can be secured to an enclosure.

4. The duplex electrical cable fitting of claim 3, wherein the duplex electrical cable fitting further includes a captive screw.

5. The duplex electrical cable fitting of claim 4, wherein the cover defines a cover connecting hole through which the captive screw is inserted to affix the cover to the base member of the connector body.

6. The duplex electrical cable fitting of claim 4, wherein the base member further includes a cover connector receiver which protrudes from a front surface of the base member.

7. The duplex electrical cable fitting of claim 6, wherein the cover connector receiver has a cover connector receiver sidewall extending between open and closed ends and is internally screw threaded.

8. The duplex electrical cable fitting of claim 7, wherein the base member defines a cover connector opening, which is configured to align with the open end of the cover connector receiver sidewall, such that the captive screw could be inserted through the aligned openings and fastened for affixing the cover to the base member.

9. The duplex electrical cable fitting of claim 1, wherein the cover engaging member further includes a first side bar and a second side bars that extend upwardly from the top of the base member and transition to the top bar.

10. The duplex electrical cable fitting of claim 1, wherein the flat is positioned closely adjacent to the cover engaging member to provide stability of the cover when it is in the open position.

11. The duplex electrical cable fitting of claim 1, wherein the cover could be completely detached from the connector body by fully disengaging the cover hook from the cover engaging member.

12. The duplex electrical cable fitting of claim 1, wherein the mounting member is cylindrical.

13. A duplex electrical cable fitting comprising:
a connector body including:
a mounting member having a mounting member sidewall extending between first and second open ends, the first and second open ends defining a cable passage therebetween; and
a base member having a cover engaging member, the cover engaging member defining a cover engaging hole, wherein the base member is connected to the mounting member at the second open end and extends downwardly therefrom;
a cover having a cover hook, the cover hook movably connected to the base member via the cover engaging hole so as to allow the cover to be movable relative thereto between open and closed positions; and
a locknut configured to engage with the mounting member,
wherein the cover hook includes a front hook portion, a lower hook portion having a cover stabilizer radially protruding from an outer surface thereof, and a rear hook portion that transitions to the cover.

14. The duplex electrical cable fitting of claim 13, wherein the front hook portion has a stair shape.

15. The duplex electrical cable fitting of claim 13, wherein, in the closed position, the cover hook and the top bar are designed and dimensioned such that the top bar is placed and tightly fitted within the width of a cover hook opening.

16. The duplex electrical cable fitting of claim 13, wherein, in the closed position, the front hook portion is parallel to the mounting member, and the lower hook portion is substantially perpendicular to the mounting member.

17. The duplex electrical cable fitting of claim 13, wherein, in the open position, the front hook portion is fully disengaged from the cover connector member, and the lower hook portion is substantially parallel with the mounting member of the connector body with the cover stabilizer sliding onto the flat.

18. The duplex electrical cable fitting of claim 13, wherein, in the open position, a flat engages with the cover stabilizer to prevent the cover from closing and to maintain its open position.

19. The duplex electrical cable fitting of claim 13, wherein, in the open position, the front hook is substantially parallel with the base member, and the lower hook portion is substantially parallel with the mounting member.

20. A method of using a duplex electrical cable fitting, the method comprising:
affixing the duplex electrical cable fitting to an enclosure by securing a mounting member of a connector body through a desired knockout opening of the enclosure;
opening a cover of the duplex electrical cable fitting such that the cover is substantially parallel with the mounting member of the connector body, the opening of the cover at least including releasing frictional engagement between a top bar of a cover engaging member of a base member of the connector body and a cover hook of the cover via removing the top bar from a cover hook opening in the cover hook;
engaging, via opening of the cover to an open position, a cover stabilizer that extends from the cover hook with a flat on an outer surface of the base member to maintain the cover hook in the open position;
installing electrical cables via openings in opposite ends of the mounting member of the connector body;
closing the cover, the closing of the cover including frictionally fitting the top bar within the cover hook opening of the cover; and
affixing the cover to a base member of the connector body with a captive screw.

* * * * *